United States Patent
Phillips

(10) Patent No.: US 9,812,074 B2
(45) Date of Patent: Nov. 7, 2017

(54) SYSTEM AND METHOD FOR FOLDABLE DISPLAY

(75) Inventor: W Garland Phillips, Barrington, IL (US)

(73) Assignee: BlackBerry Limited, Waterloo, Ontario (CA)

( * ) Notice: Subject to any disclaimer, the term of this patent is extended or adjusted under 35 U.S.C. 154(b) by 455 days.

(21) Appl. No.: 13/051,547

(22) Filed: Mar. 18, 2011

(65) Prior Publication Data

US 2012/0235894 A1    Sep. 20, 2012

(51) Int. Cl.
*G09G 5/00* (2006.01)
*G09G 3/36* (2006.01)

(52) U.S. Cl.
CPC ....... *G09G 3/36* (2013.01); *G09G 2320/0606* (2013.01); *G09G 2320/0613* (2013.01); *G09G 2340/14* (2013.01); *G09G 2380/02* (2013.01)

(58) Field of Classification Search
CPC ... G09G 2320/0606; G09G 2320/0613; G09G 2340/14; G09G 2380/02; G09G 3/36; G09G 3/003; G09G 3/20; G06F 2203/04102; G06F 3/012
USPC .......................................... 345/156, 173–175
See application file for complete search history.

(56) References Cited

U.S. PATENT DOCUMENTS

| | | | |
|---|---|---|---|
| 6,297,838 B1 * | 10/2001 | Chang et al. | .................. 715/863 |
| 6,943,773 B2 | 9/2005 | Wong et al. | |
| 7,109,967 B2 | 9/2006 | Hioki et al. | |
| 7,148,944 B2 | 12/2006 | Kinoshita et al. | |
| 7,298,365 B2 | 11/2007 | Moriyama | |
| 7,394,452 B2 | 7/2008 | Wong et al. | |
| 7,443,380 B2 * | 10/2008 | Nozawa | ........................ 345/156 |
| 7,558,057 B1 | 7/2009 | Naksen et al. | |
| 7,564,436 B2 | 7/2009 | Huitema et al. | |
| 7,714,801 B2 | 5/2010 | Kimmel | |
| 8,543,166 B2 | 9/2013 | Choi et al. | |
| 2003/0231144 A1 * | 12/2003 | Cho et al. | |
| 2004/0008191 A1 | 1/2004 | Poupyrev et al. | |

(Continued)

FOREIGN PATENT DOCUMENTS

CA    2771508 A1    9/2012
CA    2771849 A1    9/2012

(Continued)

OTHER PUBLICATIONS

"5" Folding Screen could Help take smartphones to the next level.", [Online]. Retrieved from the Internet: <URL: http://www.umpcportal.com/2008/11/5-folding-screen-could-help-take-smartphones-to-the-next-level/>, (Nov. 21, 2008), 6 pgs.

(Continued)

*Primary Examiner* — Insa Sadio
(74) *Attorney, Agent, or Firm* — Jeffrey N. Giunta; Fleit Gibbons Gutman Bongini & Bianco P.L.

(57) ABSTRACT

As described herein, there is provided methods, apparatus and computer program products to display visual information on a foldable display device. Display control signals are altered or modified to avoid display of or compensate for impairment in the display of visual information on fold deformations introduced in a display unit of the display device in response to folding of the display unit, or to reverse any alterations or modifications in the event that the fold deformations are eliminated by unfolding of the display unit.

20 Claims, 7 Drawing Sheets

(56) References Cited

U.S. PATENT DOCUMENTS

| | | | |
|---|---|---|---|
| 2004/0252913 | A1 | 12/2004 | Ahn |
| 2005/0104848 | A1 | 5/2005 | Yamaguchi et al. |
| 2005/0140646 | A1* | 6/2005 | Nozawa .................. 345/156 |
| 2006/0077544 | A1 | 4/2006 | Stark |
| 2007/0085845 | A1* | 4/2007 | Kikuchi et al. .............. 345/204 |
| 2007/0097014 | A1 | 5/2007 | Solomon et al. |
| 2007/0164923 | A1 | 7/2007 | Kanai et al. |
| 2007/0205997 | A1 | 9/2007 | Lieshout et al. |
| 2007/0228952 | A1 | 10/2007 | Kwon et al. |
| 2009/0232969 | A1 | 9/2009 | Hayton et al. |
| 2009/0244267 | A1 | 10/2009 | Yuan et al. |
| 2009/0295943 | A1 | 12/2009 | Kim et al. |
| 2010/0011291 | A1 | 1/2010 | Nurmi |
| 2010/0053073 | A1 | 3/2010 | Cohen et al. |
| 2010/0053074 | A1 | 3/2010 | Cohen et al. |
| 2010/0053075 | A1 | 3/2010 | Cohen et al. |
| 2010/0053076 | A1 | 3/2010 | Cohen et al. |
| 2010/0056223 | A1* | 3/2010 | Choi et al. .................. 455/566 |
| 2010/0060563 | A1 | 3/2010 | Hayton et al. |
| 2010/0060667 | A1 | 3/2010 | Chen et al. |
| 2010/0066685 | A1 | 3/2010 | Cain et al. |
| 2010/0085301 | A1 | 4/2010 | Cohen et al. |
| 2010/0103123 | A1 | 4/2010 | Cohen et al. |
| 2010/0117954 | A1 | 5/2010 | Cohen et al. |
| 2010/0117955 | A1 | 5/2010 | Cohen et al. |
| 2010/0117975 | A1* | 5/2010 | Cho .................. 345/173 |
| 2010/0124879 | A1 | 5/2010 | Cohen et al. |
| 2010/0141605 | A1* | 6/2010 | Kang et al. .................. 345/174 |
| 2010/0164973 | A1 | 7/2010 | Huitema et al. |
| 2010/0253766 | A1 | 10/2010 | Mann et al. |
| 2011/0057873 | A1 | 3/2011 | Geissler et al. |
| 2012/0092363 | A1 | 4/2012 | Kim et al. |
| 2012/0235893 | A1 | 9/2012 | Phillips et al. |
| 2013/0329422 | A1 | 12/2013 | Park et al. |

FOREIGN PATENT DOCUMENTS

| | | |
|---|---|---|
| CN | 101910966 A | 12/2010 |
| CN | 102723058 A | 10/2012 |
| EP | 1785805 A2 | 5/2007 |
| EP | 1967937 A1 | 9/2008 |
| EP | 2073092 B1 | 5/2010 |
| EP | 2192750 A2 | 6/2010 |
| EP | 2005894 A1 | 9/2012 |
| EP | 2500898 A1 | 9/2012 |
| GB | 2456512 A | 7/2009 |
| JP | 11272205 A | 8/1999 |
| JP | 2006243621 A | 9/2006 |
| JP | 2008151995 A | 7/2008 |
| JP | 2010211211 A | 9/2010 |
| JP | 2012198541 A | 10/2012 |
| KR | 1020100100044 B1 | 4/2012 |
| KR | 1020120106662 A | 9/2012 |
| WO | WO-03050963 A1 | 6/2003 |
| WO | WO-2008108645 A1 | 9/2008 |
| WO | WO-2010019466 A1 | 2/2010 |

OTHER PUBLICATIONS

"Chinese Application Serial No. 201210072754.9, Preliminary Amendment filed Feb. 22, 2013", w/English Claims, 8 pgs.
"European Application Serial No. 11158915.6, Extended European Search mailed Aug. 17, 2011", 8 pgs.
"European Application Serial No. 11158915.6, Response filed Jul. 20, 2012 to Extended European Search Report mailed Aug. 17, 2011", 11 pgs.
"HP's new foldable, wrappable, moldable plastic displays", [Online]. Retrieved from the Internet: <URL: http://www.techlahore.com/2008/12/11/hps-new-foldable-wrappable-moldable-plastic-displays/>, (Dec. 11, 2008), 7 pgs.
"Japanese Application Serial No. 2012-062080, Final Office Action mailed Jul. 11, 2013", w/English Translation, 4 pgs.
"Japanese Application Serial No. 2012-062080, Non Final Office Action dated Mar. 12, 2013", w/English Translation, 4 pgs.
"Japanese Application Serial No. 2012-062080, Response filed Jun. 3, 2013 to Non Final Office Action dated Mar. 12, 2013", W/English Claims, 10 pgs.
"Korean Application Serial No. 10-2012-0027948, Office Action mailed Jul. 1, 2013", w/English Translation, 9 pgs.
"Nokia Moves Ahead on Flexible Phone Displays", http://gorumors.com/nokia-moves-ahead-on-flexible-phone-displays/275279, (Jan. 18, 2010), 2 pgs.
"palmOne patents handheld with flexible dual-sided display", [Online]. Retrieved from the Internet: <URL: http://www.engadget.com/2005/02/08/palmone-patents-handheld-with-flexible-dual-sided-display/>, (Feb. 8, 2005), 2 pgs.
"Plastic Logic", [Online]. Retrieved from the Internet: <URL: http://www.plasticlogic.com/ereader/index.php>, (Archived Jul. 16, 2010), 2 pgs.
"Polymer Vision's Readius rollable display gets face time", [Online]. Retrieved from the Internet: <URL: http://www.engadget.com/2007/02/19/polymer-visions-readius-rollable-display-gets-face-time/>, (Feb. 19, 2007), 3 pgs.
"QUE ProReader", [Online]. Retrieved from the Internet: <URL: http://www.que.com>, (Archived Jul. 1, 2010), 1 pg.
"The Digital Reader from Sony", [Online]. Retrieved from the Internet: <URL: http://ebookstore.sony.com/reader/>, (Archived Aug. 25, 2010), 3 pgs.
Perton, Marc, "Flexible OLED display prototype demonstrated", [Online]. Retrieved from the Internet: <URL: http://www.engadget.com/2006/02/07/flexible-oled-display-prototype-demonstrated/>, (Feb. 7, 2006), 2 pgs.
Rankin, Mike, "Is This What a Kindle Killer Looks Like?", [Online]. Retrieved from the Internet: <URL: http://publicious.net/2009/02/11/is-this-what-a-kindle-killer-looks-like/>, (Feb. 11, 2009), 6 pgs.
"Korean Application Serial No. 10-2012-0027948, Notice of Final Rejection mailed Dec. 17, 2013", 4 pgs.
"Canadian Application Serial No. 2,771,508, Office Action mailed Dec. 19, 2013", 3 pgs.
"Korean Application Serial No. 10-2012-0027948, Response filed Sep. 30, 2013 to Non Final Office Action dated Jul. 1, 2013", With English Claims, 20.
"U.S. Appl. No. 13/051,470, Non Final Office Action mailed Mar. 26, 2014", 12 pgs.
"U.S. Appl. No. 13/051,470, Response filed Jun. 24, 2014 to Non Final Office Action mailed Mar. 26, 2014", 13 pgs.
"Canadian Application Serial No. 2,771,849, Office Action mailed Dec. 18, 2013", 3 pgs.
"Chinese Application Serial No. 201210072754.9, Office Action mailed Jun. 5, 2014", 8 pgs.
"European Application Serial No. 11158916.4, European Search Report mailed May 27, 2011", 11 pgs.
"European Application Serial No. 11158916.4, Office Action mailed May 2, 2013", 12 pgs.
"European Application Serial No. 11158916.4, Response filed Aug. 2, 2012 to Search Report mailed May 27, 2011", 13 pgs.
"European Application Serial No. 11158916.4, Response filed Nov. 6, 2013 to Office Action mailed May 2, 2013", 6 pgs.
"OOOii Open Interface Interactive Advertising", [Online]. Retrieved from the Internet: <URL: http://www.ooo-ii.com/category/responsive/head-tracking>, (Accessed on Jul. 14, 2011), 2 pgs.
"The Future of User Interfaces", [Online]. Retrieved from the Internet: <URL: Downloaded from http://sixrevisions.com/user-interface/the-future-of-user-interfaces/>, (Accessed on Jul. 14, 2011), 21 pgs.
"Canadian Application Serial No. 2,771,508, Response filed Jun. 16, 2014 to Office Action mailed Dec. 19, 2013", 11 pgs.
"Chinese Application Serial No. 201210072754.9, Response filed Oct. 20, 2014 to Office Action mailed Jun. 5, 2014", w/English Claims, 11 pgs.

(56) References Cited

OTHER PUBLICATIONS

U.S. Appl. No. 13/051,470, filed Mar. 18, 2011, System and Method for Bendable Display.

* cited by examiner

SYSTEM AND METHOD FOR FOLDABLE DISPLAY

TECHNICAL FIELD

This technology relates generally to display devices, and more particularly to foldable display devices used for display of visual information.

BACKGROUND

Foldable displays are now becoming available for use in displaying visual information such as text, video or graphics. The availability of these foldable displays is providing opportunities for innovative new display systems that can offer many advantages over conventional rigid displays.

BRIEF DESCRIPTION OF THE DRAWING

The accompanying figures, in which like reference numerals refer to identical or functionally-similar elements throughout the separate views and which are incorporated in and form part of the specification, further illustrate the present technology that is the subject of this disclosure and, together with the detailed description of the technology, serve to explain the principles of the present technology.

DETAILED DESCRIPTION

Described herein are various embodiments of display technologies used to display any kind of visual information, such as (but not limited to) text, video, pictures, two- or three-dimensional images, icons, cursors or graphics, on foldable display devices. In some embodiments, a display unit of the display device has at least some flexible portions that allow it to be folded in one or more locations. The fold may be any substantial deformation. The fold may be along one or more substantially fixed lines in the display unit, such as may be the case where a display unit is capable of folding at some places but not others. The fold may be, but need not be, a substantially sharp crease. When folded, the display unit, in one example embodiment, is deformed along a line of the fold, compromising the display of visual information in the deformed area. The display format of displayed visual information, such as but not limited to the configuration, characteristics, size, form, position, brightness, layout, shading, spacing, perspective, coloration or design, are altered, modified or changed in order to adapt the visual information to the deformed area caused by the folding or unfolding of the display unit. In one example embodiment, as described in more detail below, the display format is changed in order to avoid distortion, illegibility, imperceptibility or sub-optimal presentation of the visual information in such deformed areas or locations of the display unit. These and other embodiments, described in more detail below, enable advantageous use of foldable display devices in various applications and on various machines, such as but not limited to mobile devices, smart phones, e-readers, laptop computers, notebook computers, tablet computers, personal computers and display systems.

The following description should be read with reference to the drawings, in which like elements in different drawings are numbered in like fashion. The drawings, which are not necessarily to scale, depict illustrative embodiments and are not intended to limit the scope of the claims appended hereto. Although examples of various steps are illustrated in the various views, many of the examples provided have suitable alternatives that can be utilized. Moreover, while several illustrative applications are described throughout the disclosure it should be understood that the present technology could be employed in other applications where foldable display technology is of value.

Figure 1A:
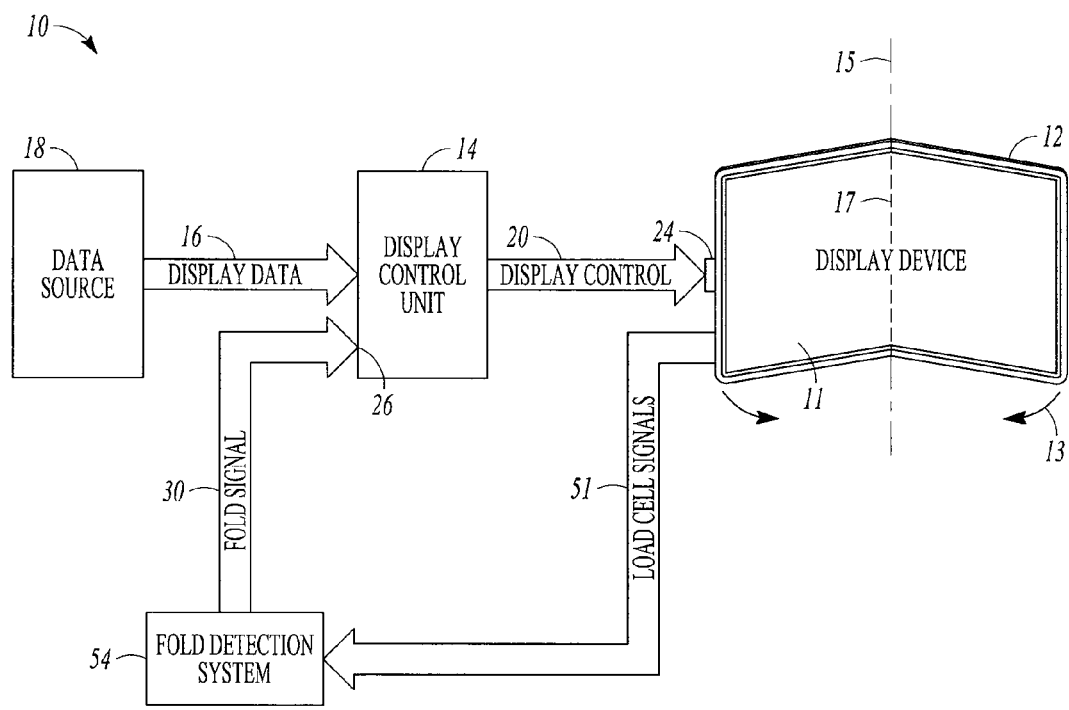
FIGS. 1A and 1B are schematic illustrations of a display system according one embodiment of the present technology.
Figure 1B:
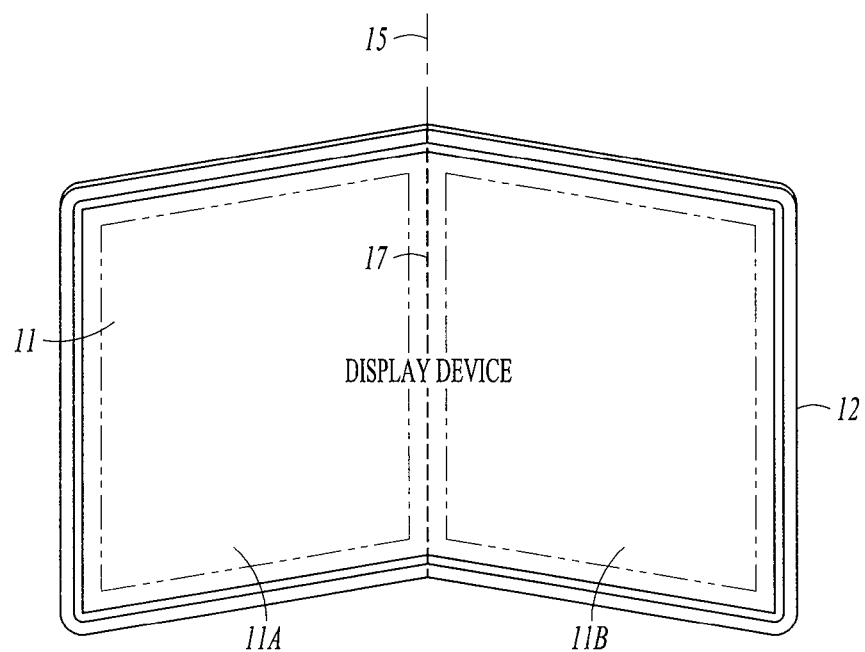

Referring now to FIGS. 1A and 1B, there is schematically illustrated a display system 10 including a display device 12 having a display element, which may also be referred to as unit 11 or display unit 11 or foldable display unit 11, capable of displaying visual information. In one example embodiment, display unit 11 is a component of display device 12, which may include additional components to provide physical support to the display unit 11 or complementary electronic functionality such as connectors or circuits to drive the display unit 11. In another example embodiment, display unit 11 is contained in a housing of display device 12, or is self-supporting or contained in a separate housing from other components of display device 12. Display unit 11, or optionally the entire display device 12, is flexible or foldable to provide for folding 13 of the display unit 11 along at least one axis 15. According to various example embodiments, the display unit 11 displays visual information using, for example but not by way of limitation, liquid crystal display elements, organic or inorganic light emitting diode elements, and/or plasma display technology, through, for example, a display surface or screen of the unit 11.

When folded, as illustrated in FIG. 1B, display unit 11 has at least one fold, along an axis 15, that creates a deformation 17 in the display, along the axis 15. The deformation 17, in some cases, takes the form of a fold line, crease or an elbow turn, and results in impairment or compromising of the ability of display unit 11 to display visual information, or impairment of the ability of a viewer to clearly see visual information displayed on or near the deformation 17. Such impairment may be caused, for example, by distortion, blocking, compression, pinching, overlap, compromised viewing angles, and/or obfuscation of visual information displayed on or near the deformation 17. When such impairment results from folding of the display unit 11 it is accordingly desirable to adjust for such impairments in order to restore unimpaired display of visual information. Conversely, when the deformation (or deformations) 17 is (are)

eliminated by unfolding of the display unit 11, adjustments made to accommodate such deformation(s) 17 may be discontinued. As used herein, references to "folding" of the display unit 11 shall mean folding the display unit 11 from a substantially planar (or default) configuration to a folded configuration, or from a folded configuration to a planar configuration, or between different degrees of folded states of the display unit 11.

According to one example embodiment, the deformation 17 of the display includes that area of the display unit 11 that is curved, compressed, pinched and/or has a discontinuity where the plane of the display changes from one orientation to another partially or fully transverse orientation on the other side of the deformation 17. According to various other example embodiments, the foldable display unit 11 and/or device 12 may be foldable along any line or location or orientation of the display unit 11 and/or device 12, or only along predetermined lines or axes. In one embodiment, described in more detail below, deformation of visual information in an area of the display is avoided by automatically dividing the display area into display sub-areas, for example areas 11A and 11B (which may be thought of as display areas on opposite sides of the fold along axis 15), that do not contain the deformation 17, and moving the display of visual information from the original display area into the sub-areas.

Referring again to FIG. 1A, a display control unit 14 receives display data 16 from a data source 18 and produces one or more display control signals 20 for application to one or more display control inputs 24 of display device 12, in order to produce visual information on the display unit 11 of display device 12. Display unit 11 is operative to display (i.e., is capable of displaying) the visual information, based at least in part on display data 16. In general, display data 16 conveys or holds or encodes the visual information to be displayed. As further illustrated in FIG. 1A, display control unit 14 includes at least one additional input 26 to receive a fold signal 30, from fold detection system 54, that is indicative of the folding or unfolding of at least some portion of display unit 11, and optionally the location(s) of fold deformations. Display control unit 14 receives display data 16 and at least one fold signal 30, indicative of a fold in display unit 11, and generates as output one or more display control signals 20 that cause display 11 unit to display the visual information. Signal 30 may take the form of one or more analog signals, or digital signals or data. Fold detection system 54 receives one or more load signals 51 from load cells 50, shown and described with respect to FIG. 2, used to detect a fold in the display unit 11.

According to one embodiment, display control unit 14 takes the form of an integrated circuit responsible for generating the timing of display control signals 20, such as, for example, horizontal and vertical synchronization signals, and a blanking interval signal. According to another example embodiment, the data source 18 is a video random access memory (RAM), or other storage device, such as but not limited to a magnetic or optical storage device, or a processing device. According to still another example embodiment, display control unit 14 is a video display processor (VDP). According to another example embodiment, the display control unit 14 is a video display controller that may take the form of a video shifter, a cathode ray tube controller (CRTC), a video interface controller, or a video code processor. According to still other example embodiments, the display control unit 14 may be mounted on a central processing unit (CPU) motherboard, or integrated into a microprocessor chip. According to other example embodiments, the display control signals 20 may be analog or digital, for example but not limited to component video, digital visual interface (DVI), video graphics array (VGA) or high-definition multimedia interface (HDMI) video control signals.

Figure 2:
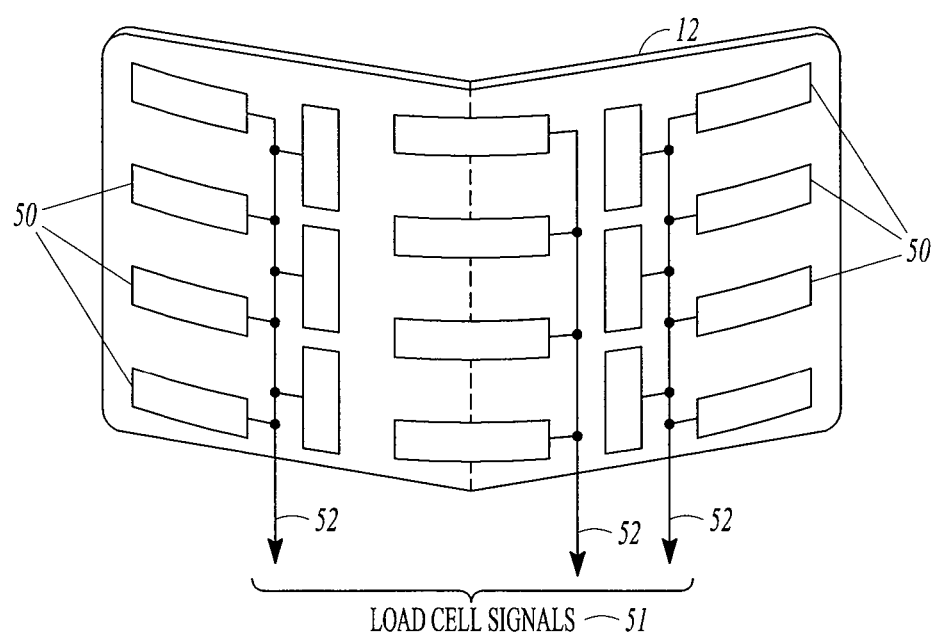
FIG. 2 illustrates a foldable display device with fold detection devices according to one example embodiment of the present technology.

According to one example embodiment, the display system of the present technology includes data source 18, display control unit 14, display device 12 (including any fold detection devices associated therewith) and fold detection system 54, as illustrated for example in FIGS. 1A, 1B and 2. In another example embodiment, the display system may include fewer than all of these components, such as, in one embodiment, the system may only include display control unit 14, or, in another example embodiment, the system may only include fold detection system 54 or, in yet another example embodiment, the system may only include fold detection system 54 and display control unit 14. Further, the methods and computer program products described herein may also, in alternative embodiments, include or encompass only the operations or functionality of the alternate system embodiments described herein.

As illustrated schematically in FIG. 2, according to one example embodiment, the fold signal 30 (shown in FIG. 1A) may be obtained or derived from one or more fold detection devices, which in one example embodiment comprise load cell(s) 50, mounted or integrated with display unit 11 and/or display device 12, that produce fold detection signals, for example in one embodiment, load cell signal(s) 51 (also shown in FIG. 1A). According to another example embodiment, the load cell(s) 50 are bonded onto display unit 11 and/or display device 12 such that folding of the display unit 11 and/or display device 12 produces corresponding analog (or, in an alternate embodiment, digital) load cell signal(s) 51 in one or more of the load cell(s) 50. The load cell signal(s) 51 from load cell(s) 50 are conveyed on signal paths 52 to the fold detection system 54 (FIG. 1A) taking, for example, the form of a computing platform having a programmable computer or other electronic device capable of interpreting the signal(s) 51 to generate fold signal 30. According to one embodiment, signal(s) 51 are analog signals, and are converted to digital signals or data and processed in fold detection system 54 to determine the location of folds in the display device 12. Alternatively, separate analog to digital circuits may be employed to digitize the signal(s) 51, if in analog form, prior to delivery to fold detection system 54.

According to another example embodiment, at least some of load cell(s) 50 are oriented fully or partially transversely to one another in order that folds in display unit 11 and/or device 12 can be ascertained in both directions or diagonally using the signal(s) 51. In still one more embodiment, described further below with respect to method 100, fold detection system 54 determines the approximate or exact degree of folding of display unit 11, or alternatively only whether the display unit 11 is folded or not, and if more than one fold axis is possible, the location of the fold axis. (In the event more than one fold axis is possible, fold detection system 54 may determine the location of each axis, as well as the degree of folding at each axis.) In one example embodiment, the determination of the foregoing is made using the relative magnitude of the signals from load cell(s) 50. In one embodiment, the signal(s) 51 generated from load cell(s) 50 are proportional to or at least can be correlated to the amount of or degree of fold in the display unit 11 and/or device 12. Such correlations may be established, for example, by storing predetermined or known signal characteristics of the load cell(s) 50, for example in the form of coefficients or other parameters stored in a memory or storage device, that are used to translate load cell signals 51 into the degree of fold in the display unit. The fold detection system 54 records fold data representing the degree of folds and location of the fold axis, or axes if more than one fold is present, in a storage device or memory, on or off-board, the fold detection system 54. According to one example embodiment, if the folding of the display unit 11 and/or device 12 is restricted to folding along one or a limited number of fold lines, a single load cell 50 may be appropriately positioned along the preset fold line in order to detect the fold along that particular line.

According to still other example embodiments, not shown, the folding or unfolding of display unit 11 or display device 12 may be determined using other means such as from images of the display device 12 captured from one or more cameras, wherein the images are processed in order to determine the folding of the display unit 11 or device 12. In another example embodiment, a signal source such as an infra-red source on one side of the display device 12 may be detected by a detector, such as an infra-red detector, on the opposite side of the display device 12, wherein the detection or magnitude of the signal detected may indicate folding or the degree of folding. In still other example embodiments, the fold detection devices may be integrated with the display unit 11, or fastened or integrated with the back (non-display) side of the display unit 11 or display device 12. In other example embodiments, the fold detection signal may be generated from user input without the use of a fold detection device.

Figure 3:
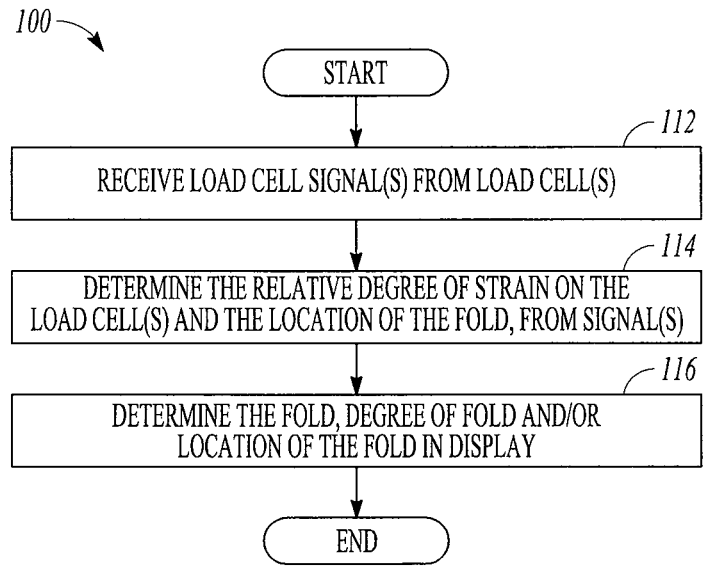
FIG. 3 is a flowchart illustrating an example method and computer program suitable for determining the folding of a display device, according to one example embodiment of the present technology.

Referring now to FIG. 3, there is illustrated a flowchart showing an example method 100, implemented in one example embodiment using a computer program executing on a computer system or platform, suitable for determining the folding, or degree of folding, and optionally the location of folding, if more than one location is possible, of the display unit 11 and/or device 12. According to method 100, load cell signal(s) 51 (serving as fold detection signals) are received from the fold detection devices, such as load cell(s) 50 (112). The method 100 determines the relative degree of strain or load on the load cell(s) 50 and the location of the fold, from signal(s) 51 (114). This determination may be made, for example, using the set of predetermined or known coefficients or parameters described above that are indicative of a correlation between load cell signals 51 and respective physical folding behavior or characteristics of the display unit 11 and/or device 12. In one embodiment, method 100 determines the fold, degree of fold and/or location of the fold in display unit 11 and/or device 12 (116), and generates or produces, in one example embodiment, the fold signal 30 that is conveyed to the display control unit 14. In another example embodiment, method 100 continuously monitors the signal(s) 51 and continuously re-determines the fold signal 30. Alternatively, for example, the determination of fold signal 30 from signal(s) 51 is on-demand from a viewer, in response to a change in the load cell signal(s) 51, and/or made from time-to-time but not continuously. According to one other example embodiment, the method 100 operates on a central processing unit and is stored in a memory device or storage device on-board or off-board fold detection system 54. Fold detection system 54 may include, in one embodiment, the computing system 700 of FIG. 7, wherein the computer program implementing method 100 may be stored and executed, for example, as described with respect to program 725.

Figure 4:
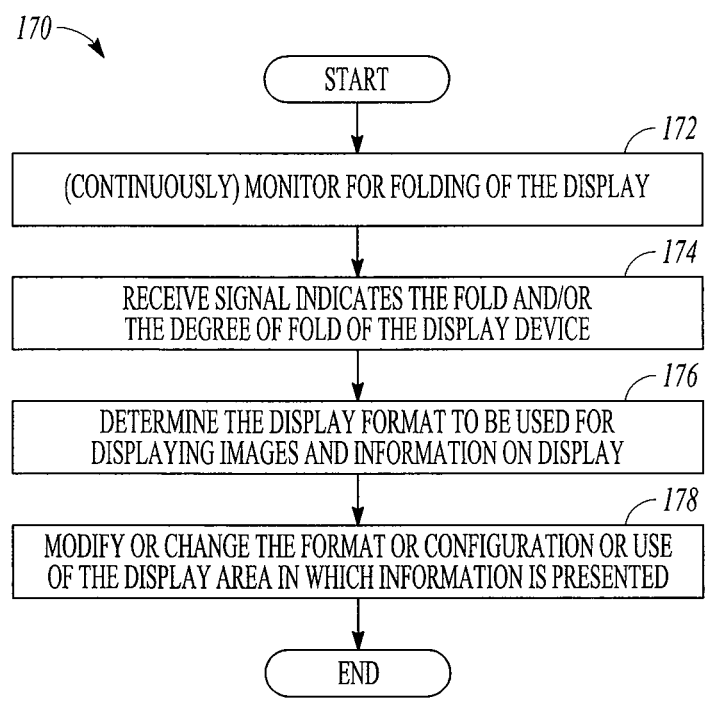
FIG. 4 is a flowchart illustrating an example method and computer program to control the format of the display according to one example embodiment of the present technology.

Referring now to FIG. 4 there is illustrated a flowchart of a method 170, implemented, in one example embodiment, using a computer program executing on a computer system or platform in display control unit 14. According to this example embodiment, method 170 operates to control the display format of visual information on display unit 11 in response to display data 16 and the fold signal 30. Method 170, in one example embodiment, continuously monitors for folding of the display, either from an unfolded state to a folded state, from one degree of folding to another degree of folding, or from a folded state to an unfolded state (172). In other example embodiments, method 170 operates only in response to detection of a folding action of the display by the fold detection devices, and/or in response to a user input that is conveyed to display control unit 14. Method 170 is responsive to fold signal 30, received from the fold detection system 54, to input and receive the fold and/or the degree of fold of the display unit 11 and/or device 12 (174). Using the fold signal 30 and the display data 16, method 170 determines the display format to be used for displaying visual information on display unit 11 (176). Based on the determined format, the visual information presented on display unit 11 are altered or modified, for example by adapting (e.g., altering or modifying) the display data 16 and/or the one or more display control signals 20, or an intermediate form of the signals and/or data, to change the format or use of the display area in which visual information is presented (178). In one mode of operation, for example, the display format may be a default format to display visual information on a substantially planar display area that is substantially the full displayable area of the display unit 11, while in a second mode of operation, the planar display area may be divided into two or more sub-areas that avoid a deformed area of the display caused by folding of the display unit 11, and the format of the visual information is adapted for this sub-divided configuration of the display unit 11.

Figure 5A:
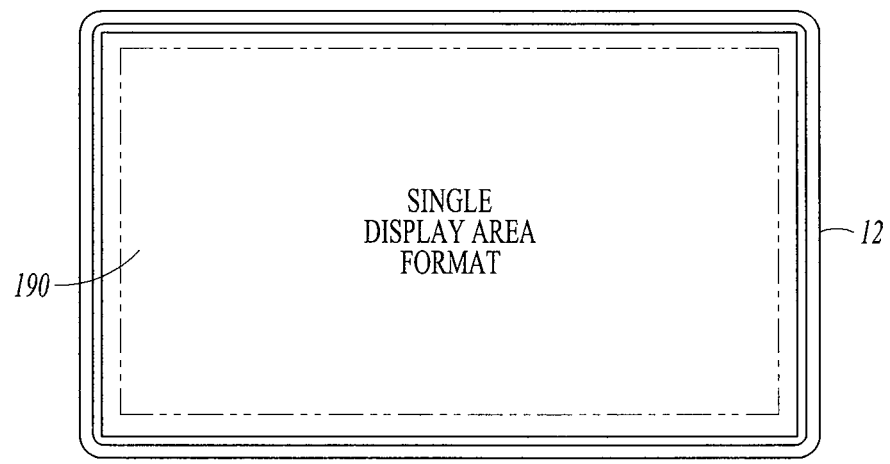
FIGS. 5A and 5B illustrate the changing of the display format from one format to another format, according to one example embodiment of the present technology.
Figure 5B:
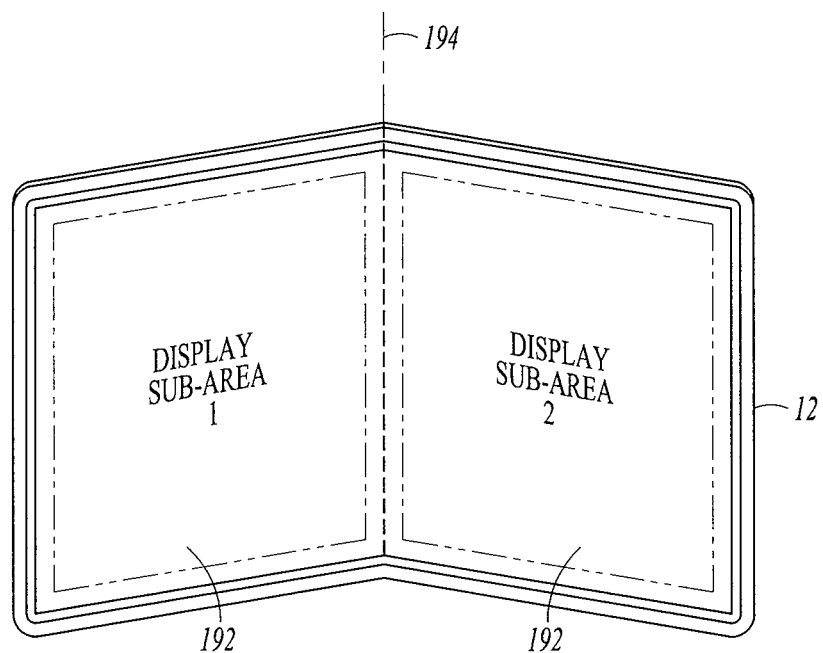

According to still another example embodiment, the visual information presented is text, and the format is changed from or between a first format in which substantially the entire display area of display unit 11 is used, and another format in which the display is divided into display sub-areas, such as illustrated in FIGS. 5A and 5B, wherein the display area in or near the deformation 17 (shown in FIGS. 1A and 1B) is not used for display, to avoid impairment in the display of information in or near the deformation 17. According to another example embodiment, visual information continues to be displayed along and in the area of the deformation 17 in the display, but is altered or changed in order to improve the perceptibility or display characteristics of the visual information, for example by performing any of the operations to alter the display as otherwise described herein, such as increasing the size of visual information, such as fonts, in the area of the deformation, or changing the color or brightness of visual information. Alternatively, for example in the case of graphical images such as in video, the portion of the video image coinciding with the deformed area of the display may be altered to diminish any actual or perceived distortion in the image, while still enabling the video image to be displayed entirely or substantially across the deformed area, or in sub-portions of the deformed area that provide the appearance of continuous image display across the deformed area. In other example embodiments, the display images are shifted or moved from a first display area that is separated by a fold, to an area of the display that is smaller and on only one side of the fold, and the scale of the images is reduced to fit into the reduced display area. According to one example embodiment, a computer program implementing method 170 (FIG. 4) operates on a central processing unit and is stored in a memory device or storage device on-board or off-board display control unit 14.

Figure 7:
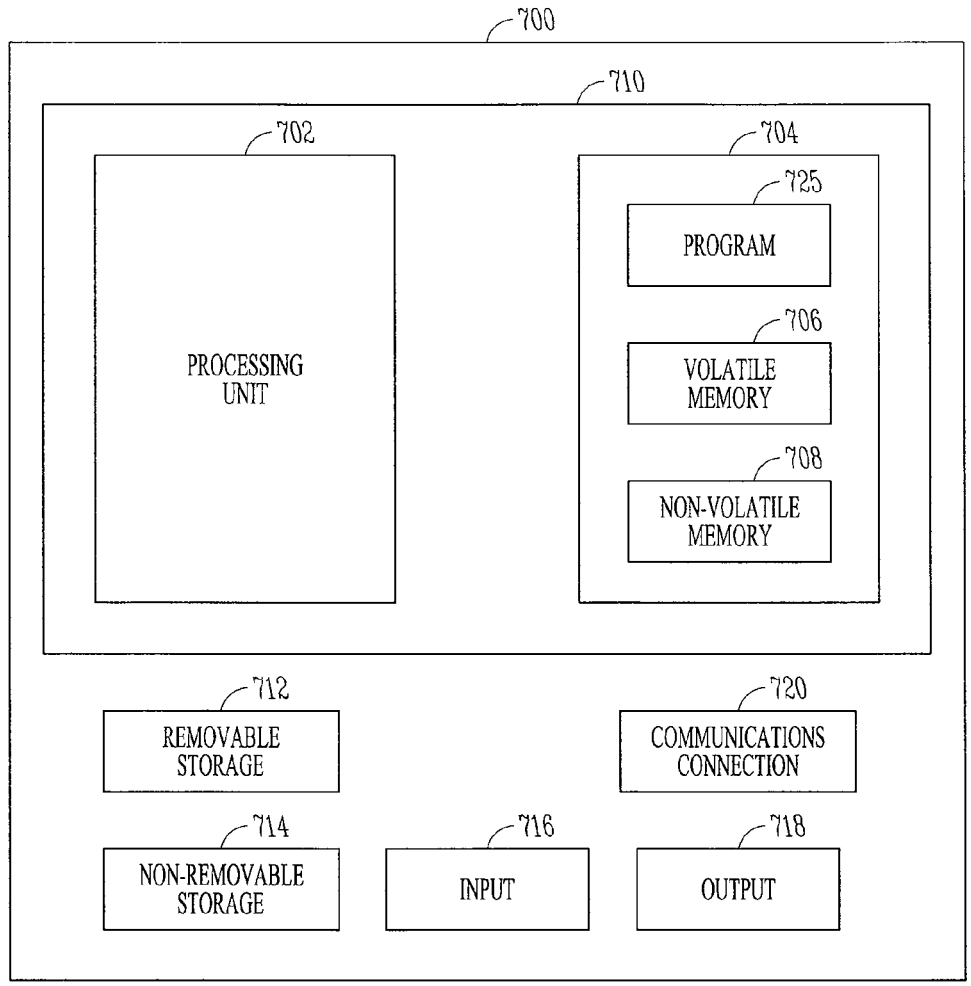
FIG. 7 illustrates in schematic form a computing platform suitable for use in certain example embodiments of the present technology.

Display control unit 14 may include, in one embodiment, the computing system 700 of FIG. 7, wherein the computer program may be stored and executed, for example, as described with respect to program 725.

In alternative embodiments, compensation for impairment or distortion in the fold deformations may include, for example, avoiding the display of visual information in the deformed area, changes in format including stretching, narrowing, enlarging, shrinking, tilting, rotating, obliterating, replicating, interpolating or changing the color of an image or part of an image. Such compensation may be performed, for example, by substituting alternative display data or modifying the display data, by transforming the display data, and/or by adapting or modifying the generation of display control signals independently of the display data. Alternatively, compensation for impairment or distortion may include, for example, substituting or modifying fonts for text, such as fonts specifically adapted to reduce distortion experienced from proximity to a deformation 17. In general, compensation or correction for impairment or distortion may reduce or eliminate one or more undesirable effects associated with the impairment or distortion. Any technique for compensation or correction may be applied. For example, the method 170 may, in one example embodiment, mathematically determine the kinds and degrees of distortion that may be experienced by a viewer, for example assuming the display device 12 is viewed from a particular, typical, viewing angle.

A change of display format from a single display area format 190 to a dual display area format 192 is illustrated in FIG. 5A and FIG. 5B. In this example embodiment, visual information displayed in the single display area format 190 of FIG. 5A is automatically reformatted to the dual area 192 of FIG. 5B upon detection of a fold along axis 194. As illustrated in FIGS. 5A and 5B, the display area formats 190 and 192, delineated by the dashed lines, do not overlap or coincide with the fold axis 194 or any deformation resulting therefrom. In another embodiment, the reformatting may take place in response to a viewer-initiated input that is conveyed to display control unit 14. According to still another example embodiment, multiple predetermined display formatting options or display templates may be stored in the memory or storage device for display control unit 14, and used, respectively, for different fold states or configurations. For example but not by way of limitation, folding of the display device 12 along the center of the display unit 11 would invoke a format providing two display sub-areas in which information is displayed, while folding the display along two fold axes may invoke a format providing for display of visual information in three display sub-areas, each within a separate plane or substantially planar area of the display. In still another example embodiment, the display templates are based on the type of visual information to be displayed, such as text, pictures, images or video, such that method 170 (or any computer program implementing the method) changes the display format based on the type of information as well as in response to the folding state or configuration of the display. For example, video such as a movie might not be split between two different sides of the display, but for example be shifted to display only in the display area on one side of a fold.

In still another example mode of operation, the display format or template provides a privacy mode of display in which only one, or certain ones, of the sub-areas of the folded display are used to display visual information, such that a viewer of the display device 12 can shield visual information displayed on the display device 12 from the view of others located near the display device 12. According to one such embodiment, the privacy mode of display is initiated by a user input to system 10. According to still other example embodiments, any unused portion of the display, for example a deformed portion in or near a fold, or a larger area not used for display due to the folding of the display unit 11, may be automatically, semi-automatically or manually (by user input), under control of method 170 (or any computer program implementing the method), deactivated and power to that area of the display reduced or eliminated, for example by directly reducing power or by altering the display data to substitute display data that causes the deactivated display area to be dimmed or darkened.

Figure 6A:
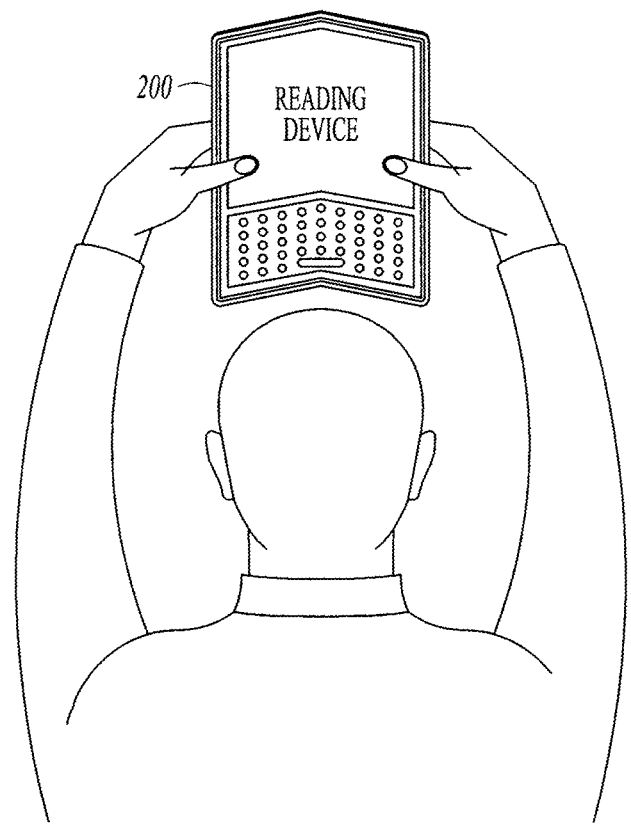
FIGS. 6A, 6B and 6C illustrate several example embodiments of devices incorporating a display system according to the present technology.
Figure 6B:
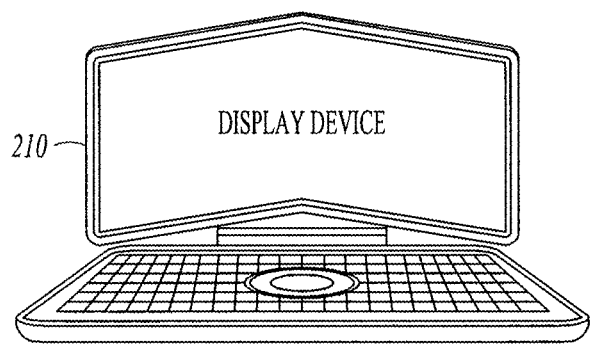
Figure 6C:
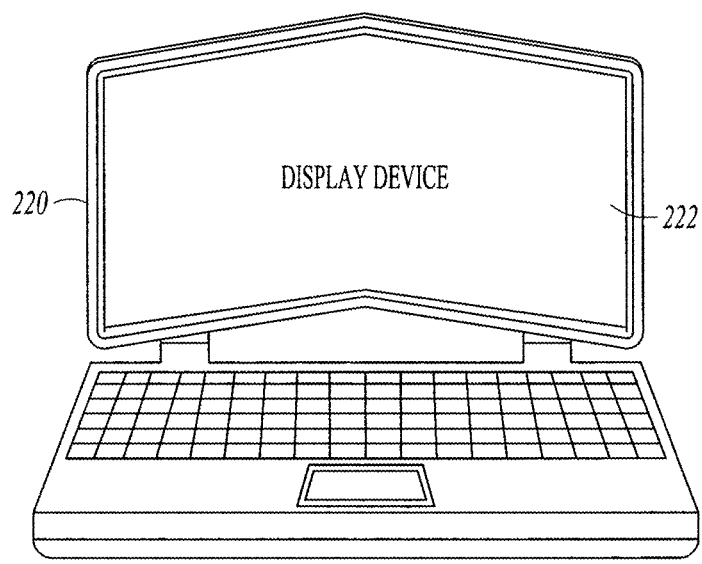

Referring now to FIGS. 6A, 6B and 6C, several example embodiments of devices incorporating display system 10 are illustrated. As illustrated in FIG. 6A, display system 10 may be incorporated in a reading device 200, such as an e-reader, that may be held in a user's hands and have a form factor such as that illustrated. As illustrated in FIG. 6B, display system 10 may be incorporated in a handheld mobile device such as a mobile telephone and/or smart phone 210. As illustrated in FIG. 6C, system 10 may be used in a personal computing system 220 with a foldable display 222 allowing the user to fold the display, for example to increase privacy in viewing the display in a crowded setting. Other devices that may incorporate the display system 10 include laptop computers, notebook computers, tablet computers, and display systems.

Referring now to FIG. 7, there is illustrated in schematic form an example computing system 700 suitable for use in display control unit 14 and/or fold detection system 54. System 700, according to one example embodiment, includes a central processing unit 710 including a processing unit 702 and memory 704, removable memory storage 712, and non-removable storage 714. Memory 704, which stores computer instructions or a computer program 725, may include volatile memory 706 and non-volatile memory 708. System 700 may include or have access to a computer environment that includes a variety of computer-readable (or machine-readable) media, such as volatile memory 706 and non-volatile memory 708, removable memory storage 712 and non-removable storage 714. Computer storage includes random access memory (RAM), read-only memory (ROM), erasable programmable read-only memory (EPROM) and electrically erasable programmable read-only memory (EEPROM), flash memory or other memory technologies, compact disc read-only memory (CD-ROM), digital versatile discs (DVD) or other optical disc storage, magnetic cassettes, magnetic tape, magnetic disc storage or other magnetic storage devices, or any other tangible and physical medium capable of storing computer-readable instructions. System 700 may include or have access to a computing environment that includes input 716, output 718, and a communications connection 720. The system 700 may operate in a networked environment using communications connection 720 to connect to one or more remote computers. The remote computers may include a personal computer (PC), server, router, network PC, a peer device or other common network node, or the like. The communications connection 720 may include a local area network (LAN), a wide area network (WAN) and other networks. Computer-readable instructions or program 725 is stored on a tangible and physical computer-readable medium in non-transitory form and executable by the processing unit 702 of the system 700. Instructions or program 725 may be stored in one or more different tangible, physical and non-transitory articles including computer-readable mediums such as memory 704 and storage 712 or 714.

Figure 8:
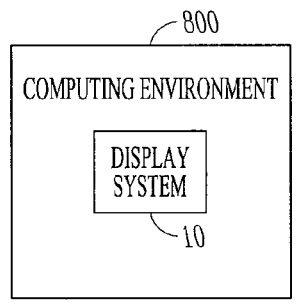
FIG. 8 illustrates the integration of a display system into a further computing environment.

As illustrated in FIG. 8, and as described above, display system 10 is further integrated in a computer environment 800, wherein environment 800 uses system 10 in order to display visual information requested by environment 800 for display, for example in response to a user selection of information or in response to a computer program executing in environment 800. In one example embodiment, computer environment 800 includes a computing platform such as that described with respect to FIG. 7.

According to one example embodiment, the display device 12 may be a foldable, wrappable, moldable plastic display, for example, available from the Hewlett-Packard (HP) corporation. According to another example embodiment, display device 12 might be a folding display, for example as available from Philips Corporation. According to another example embodiment, the foldable display may be obtained from Plastic Logic, Inc., for example as used in their Plastic Reader device.

According to still other example embodiments, the display control unit 14 is a graphics processing unit (GPU) that is a specialized microprocessor system that offloads and accelerates 3D or 2D graphics rendering from a general purpose microprocessor system in which the display control unit 14 is used. According to still another example embodiment, the display control unit 14 is integrated on the central processing unit of a general processing computer, or is deployed on a separate dedicated video card that may be installed in a slot of a personal computer or server system. According to still another example embodiment, the display control unit 14 is a hybrid of the above described solutions. In still other example embodiments, the display control unit 14 may use stream processing and general purpose GPUs. In still further embodiments, the functionality of display control unit 14 and fold detection system 54 may be combined or rearranged so that all of the functions may be in a single unit or accomplished by a single computer program or method, or so that functions of one may be substituted or added to functions of the other. Further, such functionality of unit 14 and system 54 may, in one example embodiment, be combined in whole or in part with display device 12, or another component of the system, such as a software utility or application operating on a processing system separate and apart from the display unit 14, fold detection system 54 or display device 12. In addition, according to other example embodiments, the various functionalities described herein may be implemented in hardware, software or combinations thereof.

Thus, as described above, there is provided a display system, method and computer program product for a foldable display wherein the format of the display is adjusted to avoid or compensate for impairment or distortion in the display of visual information on or near a deformation in the display resulting from folding the display. Also described, among other things, is a system, method and computer program product for detection of folds in a display unit.

Having thus described the several embodiments of the present technology, it will be readily appreciated that other embodiments may be made and used which fall within the scope of the claims attached hereto. Numerous advantages of the technology covered by this document have been set forth in the foregoing description. It will be understood that this disclosure is, in many respects, only illustrative. Changes can be made with respect to various elements described herein without exceeding the scope of the claims appended hereto.

The invention claimed is:

1. A display system, comprising:
   a foldable display unit to display visual information in a display area, the visual information based at least in part on display data; and
   a display control unit receiving the display data and at least one fold signal indicative of a fold in at least a portion of the display area, and outputting one or more display control signals operative to cause the display unit to display the visual information, the display control signals being output at least in part in response to the at least one fold signal to adapt the one or more display control signals to change an appearance of the visual information,
   wherein the one or more display control signals to change the appearance avoids the display of the visual information on or near a fold axis in the folded display unit,
   wherein the fold in the display unit creates a deformed area located within the display area, the deformed area located adjacent to the fold axis of the display unit;
   wherein the display control unit outputs one or more display control signals to change the appearance of the visual information to compensate for impairment in the deformed area that is caused by the fold;
   wherein the appearance of the visual information in or near the deformed area is changed from a first display format to a second display format, the second display format configured to provide a display of the same visual information provided in the first display format; and
   wherein the second display format compensates for impairment of visual information displayed in or near the deformed area by providing an appearance of a continuous display of the visual information across the deformed area while maintaining a constant size of the continuous display of the visual information in the first display format and in the second display format.

2. A system according to claim 1, wherein the one or more display control signals to change the appearance divides a display area into at least two display sub-areas.

3. A system according to claim 1, wherein the one or more display control signals to change the appearance compensates for impairment of the visual information displayed in or near the deformed area that is experienced by a viewer of the visual information at a particular viewing angle.

4. A system according to claim 1, wherein the display unit includes at least one device to detect the fold in the display unit.

5. A system according to claim 1, wherein the fold signal indicative of the fold in the display unit is generated automatically or is generated in response to a user input.

6. A system according to claim 1, wherein the visual information displayed in the first display format comprises text extending into the deformed area, and wherein the text displayed in the second display format is adapted to appear in display areas on opposite sides of the deformed area in the display unit.

7. A system according to claim 1, wherein the display unit includes one or more display elements, the display elements including: liquid crystal display, plasma display, light emitting diode display, or organic light emitting diode display elements.

8. A system according to claim 1, wherein the visual information includes video, text, pictures or graphics.

9. The system according to claim 1, wherein the deformed area surrounds the fold axis of the display unit, and wherein the deformed area includes a portion of the display area exhibiting a visible discontinuity provided from a plane of the display area changing from an first orientation to a second orientation.

10. The system according to claim 1, wherein the second display format is configured to perform substituting or modifying of a font displayed in the first display format, and wherein the second display format is configured to perform one or more of: stretching, narrowing, enlarging, shrinking, tilting, rotating, obliterating, replicating, interpolating color, or changing color of an image or part of an image displayed in the first display format.

11. A display system, comprising:
a foldable display unit to display visual information in a display area, the visual information based at least in part on display data;
a fold detection system receiving at least one fold detection signal and outputting at least one fold signal indicative of a fold in the display unit and a location of the fold in the display unit; and
a display control unit receiving the display data and the at least one fold signal and outputting one or more display control signals operative to cause the display unit to display the visual information, the display control signals being output at least in part in response to the least one fold signal to adapt a appearance of the visual information from a first display format adapted to a first folded state of the display unit to a second display format adapted to a second folded state of the display unit to compensate for impairment from a deformed area of the display area when folded,
wherein the one or more display control signals adapt the appearance to avoid the display of the visual information on or near a fold axis in the folded display unit,
wherein the second display format adapted to the second folded state of the display unit is configured to provide a display of the same visual information provided in the first display format adapted to the first folded state of the display unit; and
wherein the second display format adapted to the second folded state of the display unit is configured to compensate for impairment of visual information displayed in or near the deformed area by providing an appearance of a continuous display of the visual information across the deformed area while maintaining a constant size of the continuous display of the visual information in the first display format and in the second display format.

12. A system according to claim 11, wherein a display template adapted to the first folded state of the display unit and the second folded state of the display unit is associated with types of visual information and the fold state of the display unit, wherein the display control unit receives the display template and generates the display control signals at least in part based on the display template.

13. A system according to claim 11, wherein the display control unit is a specialized graphics processing unit, general purpose computer, or a combination of general purpose computer and specialized graphics processing unit.

14. A system according to claim 11, wherein the display unit and display control unit enable display of information within a: personal computer, smart phone, mobile phone, laptop computer, notebook computer, reading device, or tablet computer.

15. A method comprising:
generating one or more display control signals, at least in part in response to display data, to cause a foldable display unit to display visual information in a display area, the visual information displayed in the display area according to a first display format;
monitoring a signal indicative of a fold in the display unit; and
in response to the signal indicative of a fold in the display unit, generating the one or more display control signals to change the display of visual information in the display area to at least one second display format, wherein the second display format compensates for impairment in the display of visual information in the display area that is introduced by the fold in the display unit,
wherein the display control signals are changed to avoid the display of visual information on or near portions of a deformed area introduced by the fold in the display unit,
wherein the second display format is configured to compensate for impairment of visual information displayed in or near the deformed area of the display area by providing an appearance of a continuous display of the visual information across the display area including the deformed area while maintaining a constant size of the continuous display of the visual information in the first display format and in the second display format.

16. A method according to claim 15, further including modifying or replacing the display data in order to alter the one or more display signals.

17. A method according to claim 15, wherein the one or more display control signals are generated at least in part by a: personal computer, smart phone, mobile phone, laptop computer, notebook computer, reading device, or tablet computer.

18. A computer program product comprising a non-transitory machine-readable media, the machine-readable media including computer program instructions, the instructions adapted to execute on a computing system to:
monitor a signal indicative of a fold in a display unit; and
in response to the signal indicative of a fold in the display unit, generate one or more display control signals to change a display of visual information to at least one second display format, wherein the second display format compensates for impairment in the display of visual information visible in a first display format that is introduced by folding the display unit,
wherein the at least one second display format avoids the display of the visual information on or near a fold axis in the folded display unit,
and
wherein the second display format is configured to compensate for impairment of visual information displayed in or near the deformed area of the display area by providing an appearance of a continuous display of the visual information across the display area including the deformed area while maintaining a constant size of the continuous display of the visual information in the first display format and in the second display format.

19. A computer program product according to claim 18, further including instructions adapted to execute on the computing system to be responsive to one or more display templates specifying a format for display of visual information that is responsive to both the type of visual information and the state of folding of the display unit.

20. A computer program product according to claim 18, further including instructions adapted to execute on the computing system to be responsive to a location of the fold in the display unit in order to change the format for display of visual information.

\* \* \* \* \*